US012438303B2

(12) United States Patent
Chen et al.

(10) Patent No.: US 12,438,303 B2
(45) Date of Patent: Oct. 7, 2025

(54) PLUG CONNECTOR WITH BLOCKING BAR

(71) Applicant: BELLWETHER ELECTRONIC CORP., Taoyuan (TW)

(72) Inventors: Kuan-Wu Chen, Taoyuan (TW); Hsing-Yu Lee, Taoyuan (TW); Yen-Jang Liao, Taoyuan (TW)

(73) Assignee: BELLWETHER ELECTRONIC CORP., Taoyuan (TW)

( * ) Notice: Subject to any disclaimer, the term of this patent is extended or adjusted under 35 U.S.C. 154(b) by 388 days.

(21) Appl. No.: 17/992,749

(22) Filed: Nov. 22, 2022

(65) Prior Publication Data

US 2023/0261419 A1 Aug. 17, 2023

Related U.S. Application Data

(60) Provisional application No. 63/309,861, filed on Feb. 14, 2022.

(30) Foreign Application Priority Data

Aug. 10, 2022 (TW) ................................ 111208679

(51) Int. Cl.

*H01R 13/627* (2006.01)
*H01R 13/52* (2006.01)
*H01R 13/633* (2006.01)

(52) U.S. Cl.

CPC ..... *H01R 13/6272* (2013.01); *H01R 13/5213* (2013.01); *H01R 13/6335* (2013.01)

(58) Field of Classification Search

CPC ............ H01R 13/6272; H01R 13/5213; H01R 13/6335; H01R 13/6275; H01R 13/629
USPC .......................................................... 439/352
See application file for complete search history.

(56) References Cited

U.S. PATENT DOCUMENTS

| | | | | |
|---|---|---|---|---|
| 7,083,459 | B1 * | 8/2006 | Wu | H01R 13/6275 439/354 |
| 10,879,634 | B1 * | 12/2020 | Liao | H01R 13/6587 |
| 2021/0075158 | A1 * | 3/2021 | Hsu | H01R 13/6335 |
| 2021/0135402 | A1 * | 5/2021 | Li | H01R 13/6335 |
| 2021/0175663 | A1 * | 6/2021 | Hsiao | H01R 13/6275 |
| 2021/0249816 | A1 * | 8/2021 | Truong | H01R 13/6335 |
| 2022/0029355 | A1 * | 1/2022 | Yu | H01R 13/42 |

FOREIGN PATENT DOCUMENTS

| | | |
|---|---|---|
| TW | M584035 | 9/2019 |
| TW | M591719 | 3/2020 |
| TW | M593669 | 4/2020 |
| TW | M597517 | 6/2020 |
| TW | M597991 | 7/2020 |

* cited by examiner

*Primary Examiner* — Gary F Paumen
(74) *Attorney, Agent, or Firm* — MUNCY, GEISSLER, OLDS & LOWE, P.C.

(57) ABSTRACT

A plug connector includes an insulating body, an elastic latch, and a blocking bar. The blocking bar is connected to the insulating body and spans a pushing portion of the elastic latch. The pushing portion has at least one hook and a pushing end hung in the air. The blocking bar is located between the hook and the pushing end for protecting the pushing end.

19 Claims, 12 Drawing Sheets

PLUG CONNECTOR WITH BLOCKING BAR

CROSS REFERENCE TO RELATED APPLICATIONS

This application claims priority of Application No. 111208679 filed in Taiwan on Aug. 10, 2022 under 35 U.S.C. § 119; and this application claims priority of U.S. Provisional Application No. 63/309,861 filed on Feb. 14, 2022 under 35 U.S.C. § 119(e), the entire contents of all of which are hereby incorporated by reference.

BACKGROUND OF THE INVENTION

The present invention is related to an electronic connector, particularly, a plug connector with a blocking bar.

FIELD OF THE INVENTION

A conventional plug connector generally includes a grip, as disclosed in U.S. Pat. No. 10,879,634. The grip is an elastic latch, when the plug connector is plugged by a user into a mating socket connector, the elastic latch (grip) will fasten the plug connector on the socket connector, to prevent the plug connector from coming off of the socket connector. When the user presses the elastic latch, the elastic latch will release the plug connector from the socket connector, so that the user can easily unplug the plug connector from the socket connector. The aforementioned elastic latch has been disclosed by Taiwan Patent Nos. M593669, M584035, M591719, M597517 and M597991.

However, a pushing end of the elastic latch is hung in the air, and it is exposed on the outside of the insulating base of the plug connector, this makes the plug connector susceptible to damage or deformation through accidental contact or impact.

SUMMARY OF THE INVENTION

The present invention provides a plug connector that can solve the above-mentioned problem, which includes an insulating body, an elastic latch and a blocking bar. The insulating body includes a mating portion and a receiving slot located on the top surface of the mating portion. The elastic latch includes a fixed portion and a pushing portion connected to the fixed portion. The fixed portion is fixed in the receiving slot of the mating portion. The pushing portion is located on top of the fixed portion. The pushing portion further includes a pushing end and at least a hook. The pushing portion is hung in the air, the hook is located between the fixed portion and the pushing portion. The blocking bar is connected to the insulating body and spanning over the top of the pushing portion of the elastic latch, wherein the blocking bar is located between the pushing end of the elastic latch and the hook.

DETAILED DESCRIPTION

Figure 1:
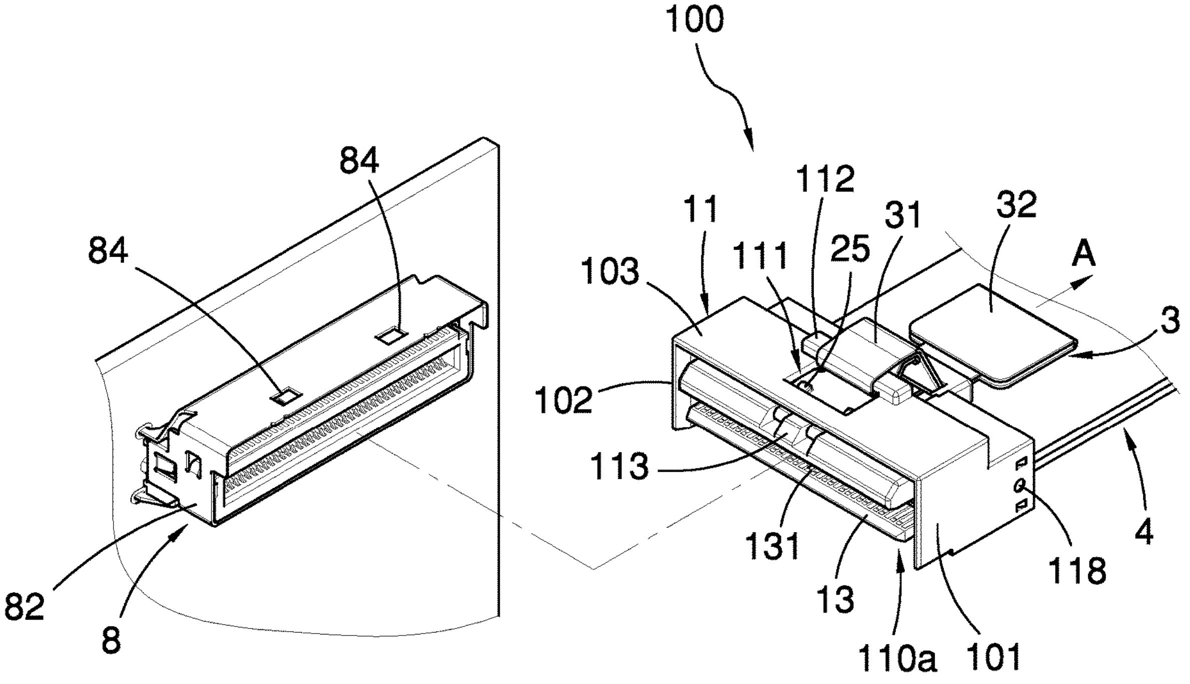
FIG. 1 is a perspective view of a plug connector of the present invention.
Figure 2:
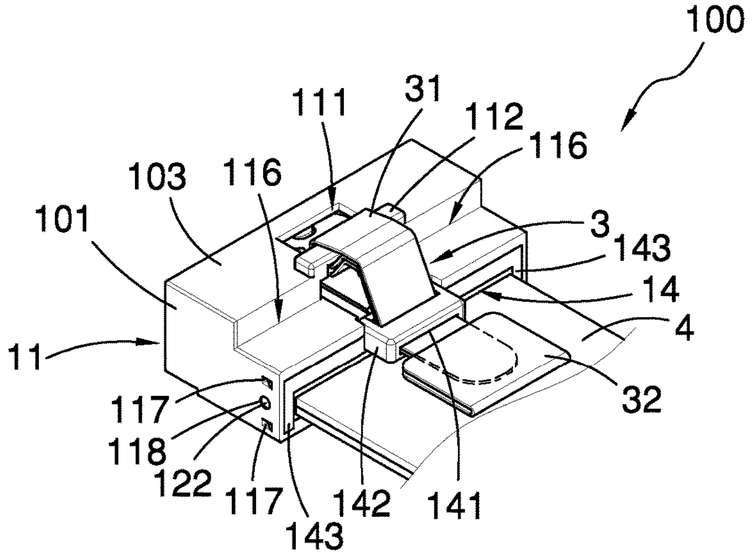
FIG. 2 is a perspective view of the plug connector of the present invention from a different angle.
Figure 3:
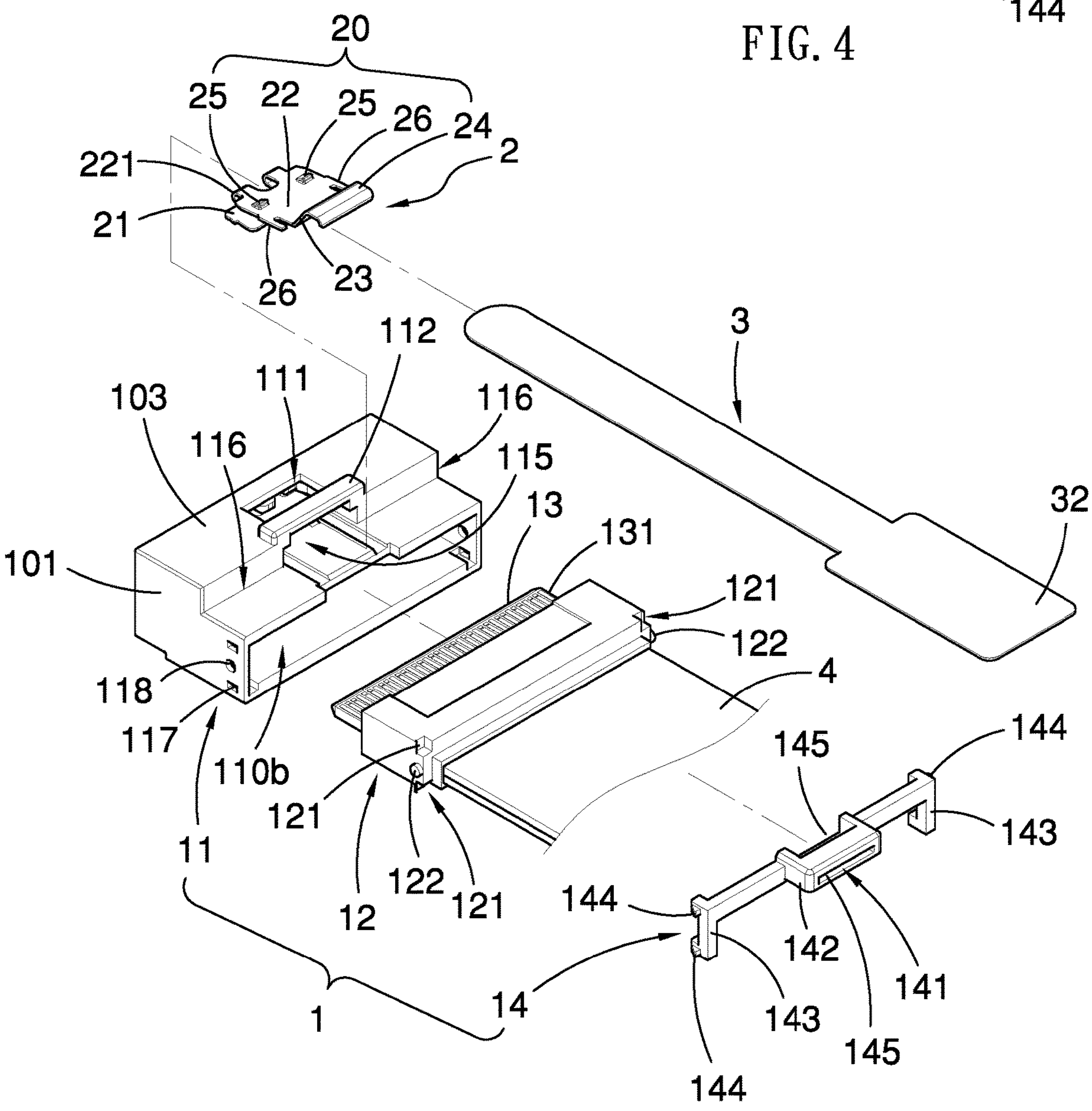
FIG. 3 is an exploded perspective view of the plug connector of the present invention.
Figure 5:
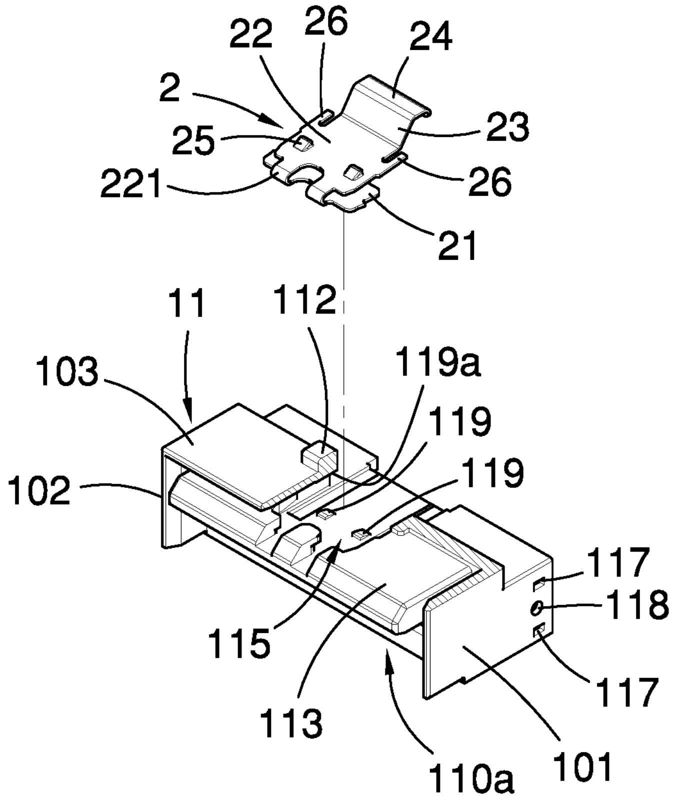
FIG. 5 is an exploded perspective view of the first housing and the elastic latch of the plug connector of the present invention.
Figure 6:
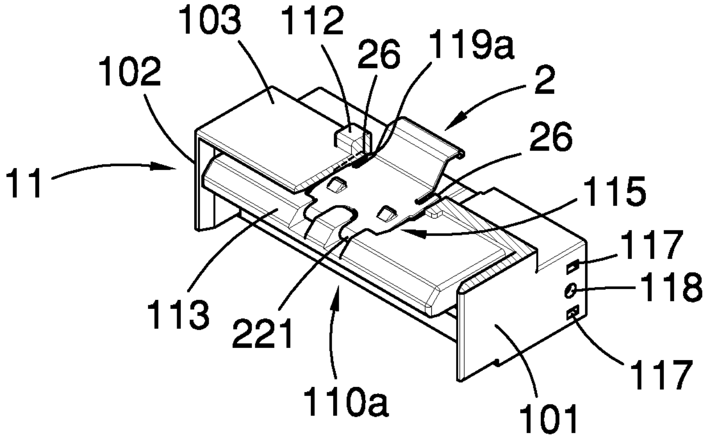
FIG. 6 is an assembly view of the first housing and the elastic latch of the plug connector of present invention.

FIGS. 1-3 illustrate a plug connector 100 and a mating socket connector 8. The plug connector 100 comprises an insulating body 1, an elastic latch 2 and a blocking bar 112. As shown in FIGS. 1, 3 and 5, the insulating body 1 has a mating portion 113 and a receiving slot 115 is located on a top surface of the mating portion 113. The elastic latch 2 includes a fixed portion 21 and pushing portion 20 connected to the fixed portion 21. As can be seen in FIGS. 3, 5 and 6, the fixed portion 21 is fixed in the receiving slot 115 of the insulating body 1. The pushing portion 20 is located on the top of the fixed portion 21 and includes a pushing end 24 hung in the air, and at least one hook 25 located between the fixed portion 21 and the pushing end 24. The blocking bar 112 is connected to the insulating body 1 and spanning over the top of the pushing portion 20 of the elastic latch 2. In other embodiment, a height of the blocking bar 112 is higher than or equal to a height of the elastic latch 2 (or the pushing end 24). Moreover, the blocking bar 112 is located between the pushing end 24 of the elastic latch 2 and the hook 25.

Figure 7:
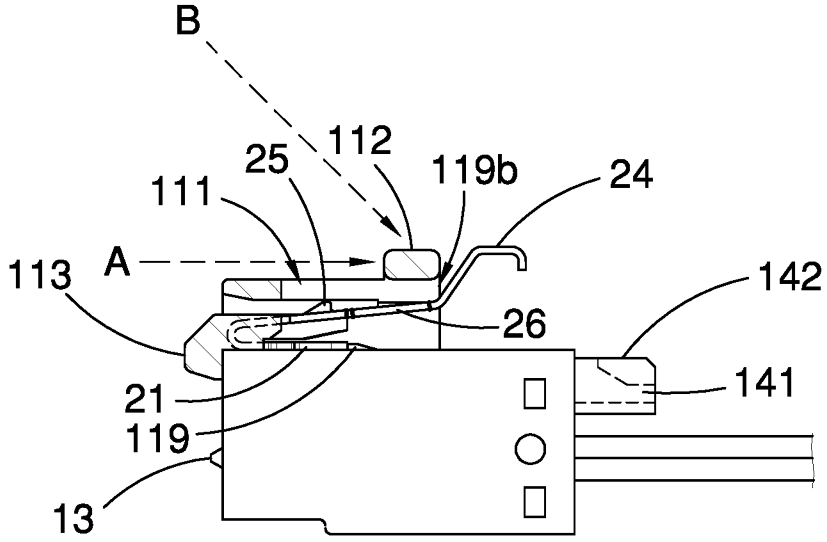
FIG. 7 is a partial cross-sectional view of the first housing of the plug connector of the present invention.
Figure 8:
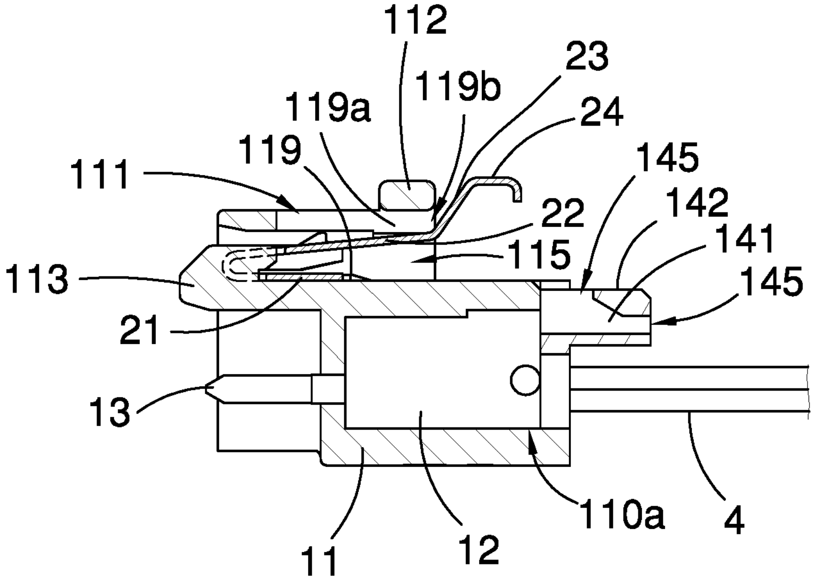
FIG. 8 is a partial cross-sectional view of the insulating body and the elastic latch of the plug connector of the present invention.

The plug connector 100 uses the blocking bar 112 as a cover for the pushing portion 20, this could reduce the chance of foreign objects directly touching the pushing portion 20, for example, a foreign object moving along direct A or B (as shown in FIG. 7) will be blocked by the blocking bar 112 and will not directly hit the pushing end 24, thus reducing the chances of accidental contact of the pushing end 24 and causing the pushing end 24 to be deformed or damaged due to impact.

As shown in FIGS. 1 to 3, the insulating body 1 further comprises a first housing 11, a second housing 12, and a cover 14. The first housing 11 includes two opposing side plates 101 and 102, a top plate 103 connected to the two side plates 101 and 102, and a first cavity 110*a* formed by the top plate 103 and the two side plates 101 and 102, wherein the top plate 103 further comprises a window 111 in communication with the first cavity 110*a*. The mating portion 113 is connected to the first housing 11 and located in the first cavity 110*a*. The blocking bar 112 is connected to the top plate 103 of the first housing 11 and spanning over the top of the window 111.

Figure 4:
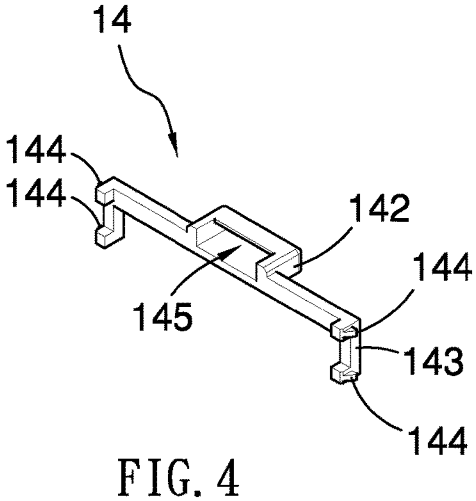
FIG. 4 is a perspective view of the cover of the plug connector of the present invention.

The second housing 12 and the cover 14 are inserted into a rear end of the first housing 11 and fixed therewith. As shown in FIGS. 3 and 4, the cover 14 has a passageway 141 in a protrusion 142 on the rear end thereof. The protrusion 142 is extended to be beyond the rear side of the first housing 11. The passageway 141 is lower than the pushing portion 24.

Two stages 116 are respectively located on two sides of the receiving slot 115, and the blocking bar 112 is connected between the two stages 116. First openings 117 (or notches) are on the surrounding of a second cavity 110*b* of the first housing 11. Second openings 118 (or notches) are on the surrounding of the second cavity 110*b*.

The second housing 12 is assembled in the second cavity 110*b* of the first housing 11 and has at least one recess 121 on the rear end. The second housing 12 has second projections 122 and fixed with one of the second corresponding openings 118 (or notches) when inserted into the second cavity 110*b*.

A tongue 13 located on the front end of the second housing 12. A cable 4 located on the rear end of the second housing 12. The tongue 13 may be a PCB with fingers 131 on the surface(s). The cable 4 has wires electrically connected to the fingers 131. The second housing 12 covers the connecting portion of the tongue 13 and the cable 4.

The cover 14 is assembled in the second cavity 110*b* and located in the rear of the second housing 12. The cover 14 has the protrusion 142 and two arms 143 respectively extended from two sides of the protrusion 142. The first projections 144 are located on the arms 143 and fixed with one of the corresponding first openings 117 (or notched) when inserted into the second cavity 110*b* and the arms 143 of the cover 14 are docked with the recess 121 of the second housing 12. The passageway 141 is located in the protrusion 142 and has two openings 145 on two sides of the protrusion 142. The two sides are adjacent.

As shown in FIGS. 3 and 5-8, the pushing portion 20 of the elastic latch 2 further comprises at least one bending portion 221, a first tilting portion 22 and a second tilting portion 23. The bending portion 221 is connected between one end of the fixed portion 21 and one end of the pushing portion 20 and so the other ends of the pushing portion 20 and the fixed portion 21 are extended toward roughly the same direction. The second tilting portion 23 is extended upward and backward from the first tilting portion 22. The pushing portion 24 is extended upward and backward from the second tilting portion 23 to be higher than the first housing 11. The pushing portion 24 may also be higher than the blocking bar 112 that is in the rear of the hooks 25. The hooks 25 are located on a top surface the first tilting portion 22 and are exposed to the window 111 of the first housing 11.

When the fixed portion 21 of the elastic latch 2 is fixed in the receiving slot 115 of the insulating body 1, at least one bump 119 on the receiving slot 115 fastens or blocks a rear end of the fixed portion 21. At least one limiting portion 26 of the first tilting portion 22 presses against a support 119*a* of the blocking bar 112 (or the top plate 103) to form a gap 119*b* between the first tilting portion 22 and the blocking bar 112. In this embodiment, the support 119*a* is extended from the bottom of the blocking bar 112.

As shown in FIG. 1, a corresponding latch 82 of the socket connector 8 has at least one hole 84. When inserting the plug connector 100 into the socket connector 8, the hooks 25 of the elastic latch 2 are inserted into the holes 84 of the latch 82, so that the elastic latch 2 is locked with the latch 82 of the socket connector 8. When the pushing end 24 of the elastic latch 2 is pressed by a user to move downward, the first tilting portion 22 of the elastic latch 2 will immediately move downward along with the pushing end 24, causing the hooks 25 on the first tilting portion 22 to disengage from the holes 84 of the latch 82, so that the elastic latch 2 is unlocked with the latch 82 of the socket connector 8.

As shown in FIGS. 1-3, the plug connector 100 further comprises a pull tab 3. The pull tab 3 passes through the passageway 141 of the cover 14 and has a connecting portion 31 and a pulling portion 32. The connecting portion 31 is connected to the blocking bar 112 of the insulating body 11 on one side of the passageway 141 and the pulling portion 32 is on the other side of the passageway 141.

Figure 9:
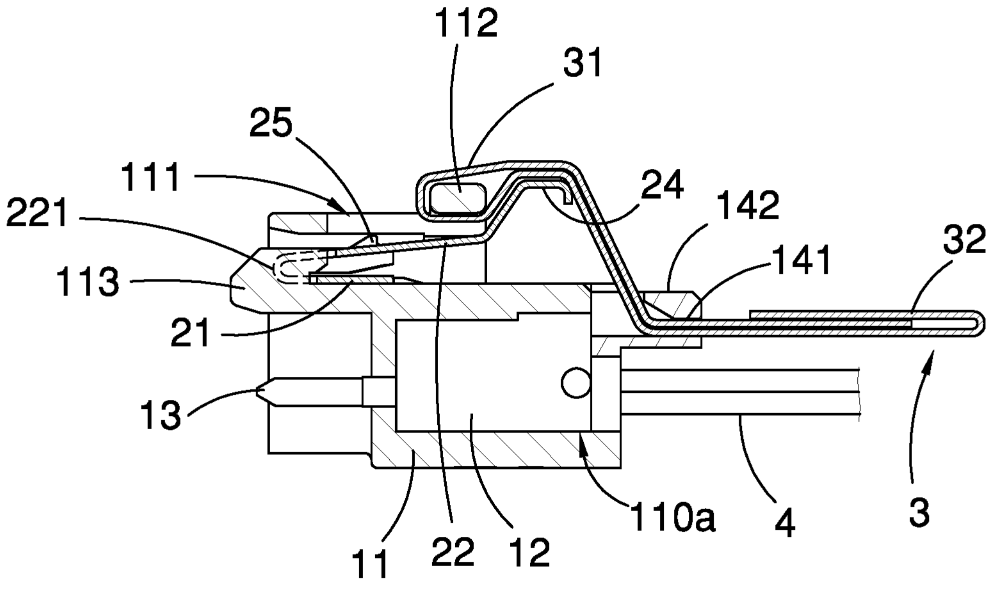
FIG. 9 is a partial cross-sectional view of the plug connector of the present invention.
Figure 10:
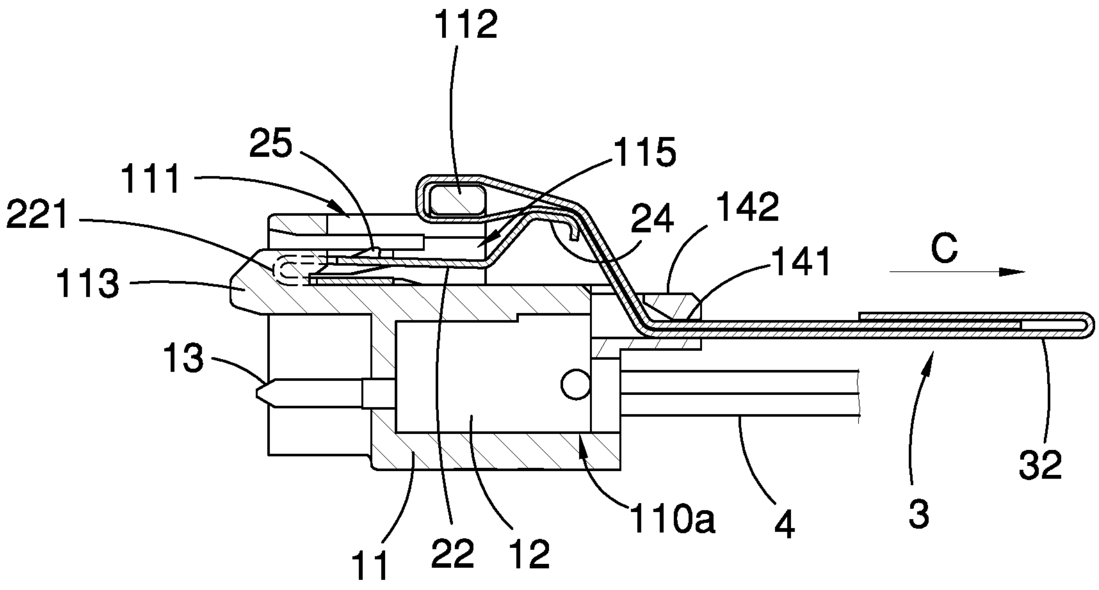
FIG. 10 is a partial cross-sectional view showing the pull tab being pulled towards the first direction.
Figure 11:
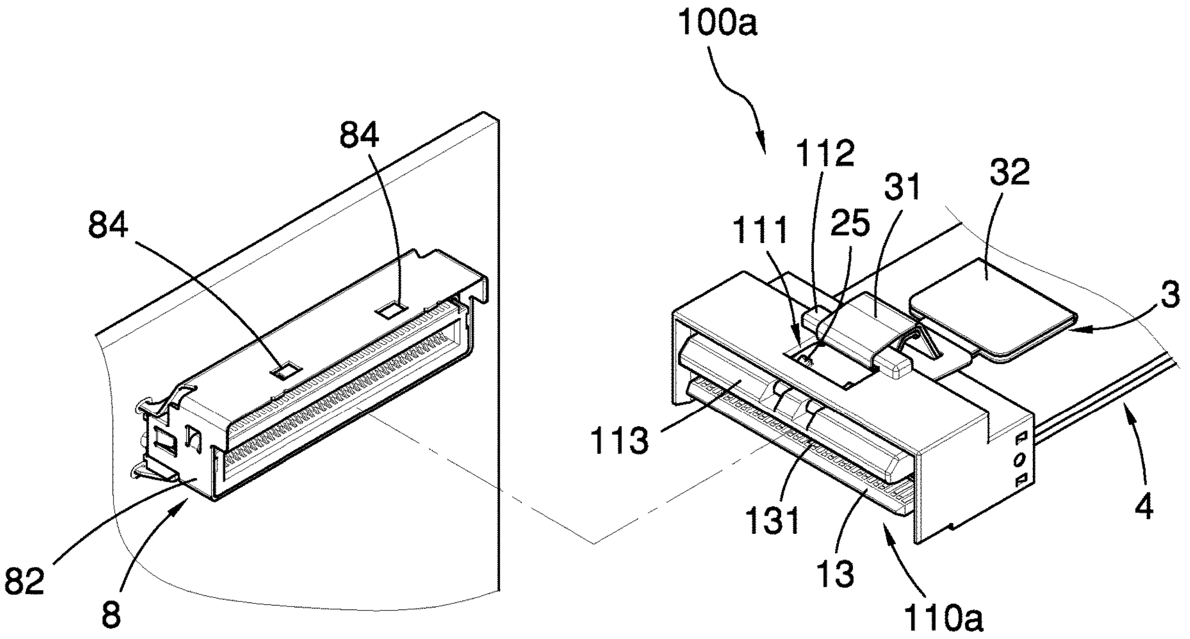
FIG. 11 is a perspective view of a plug connector of the present invention.
Figure 12:
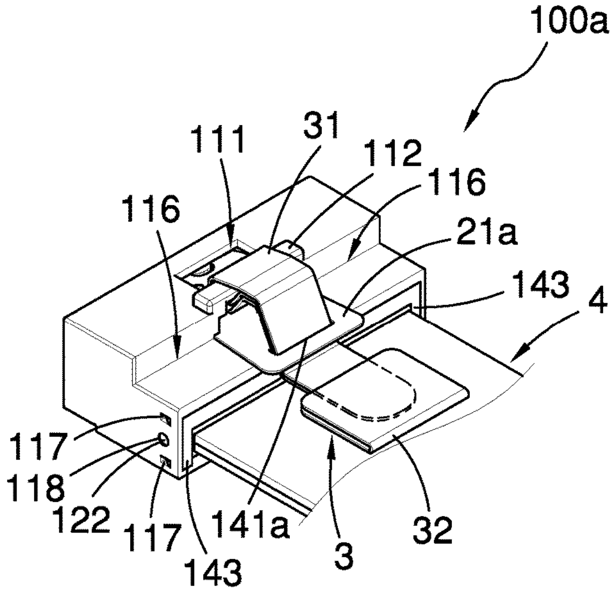
FIG. 12 is a perspective view of the plug connector of the present invention from a different angle.
Figure 13:
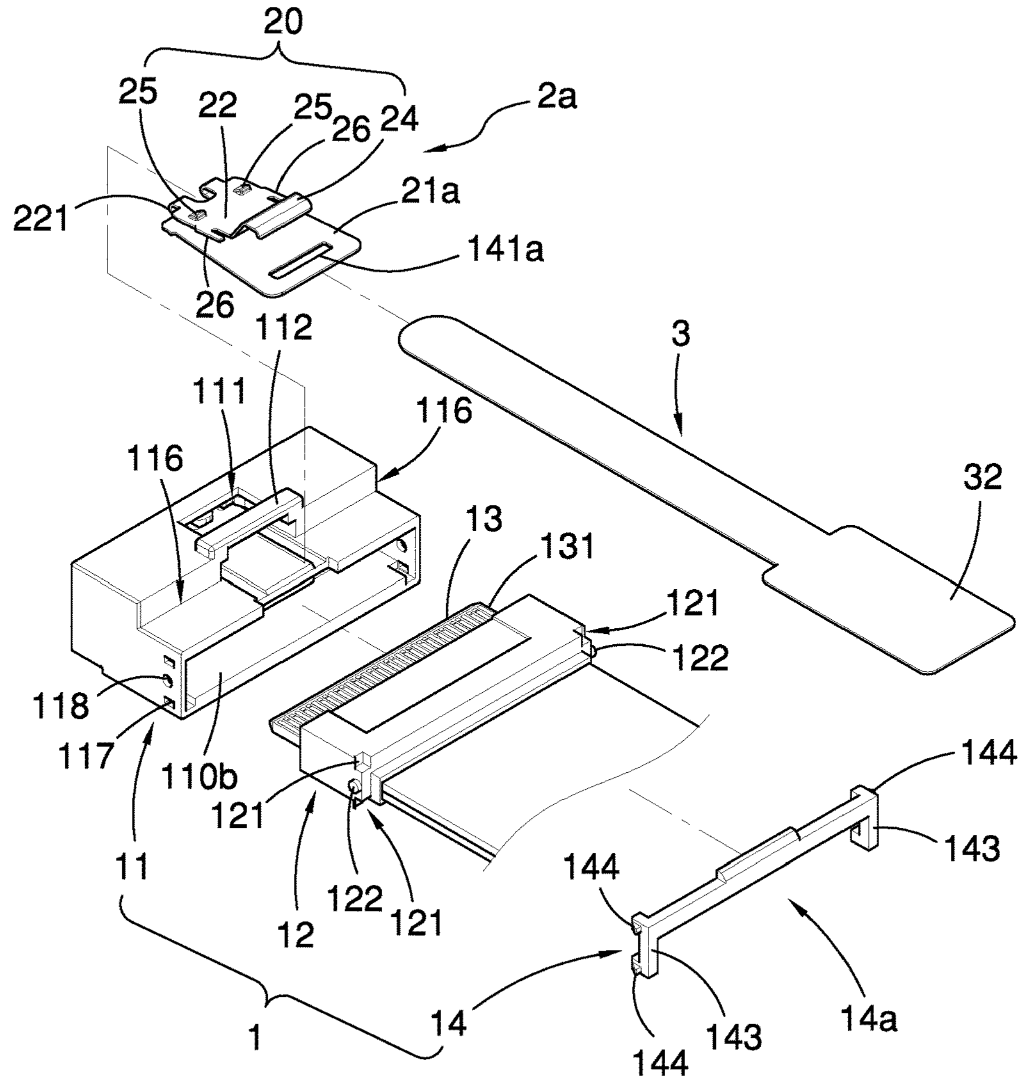
FIG. 13 is an exploded perspective view of the plug connector of the present invention.
Figure 14:
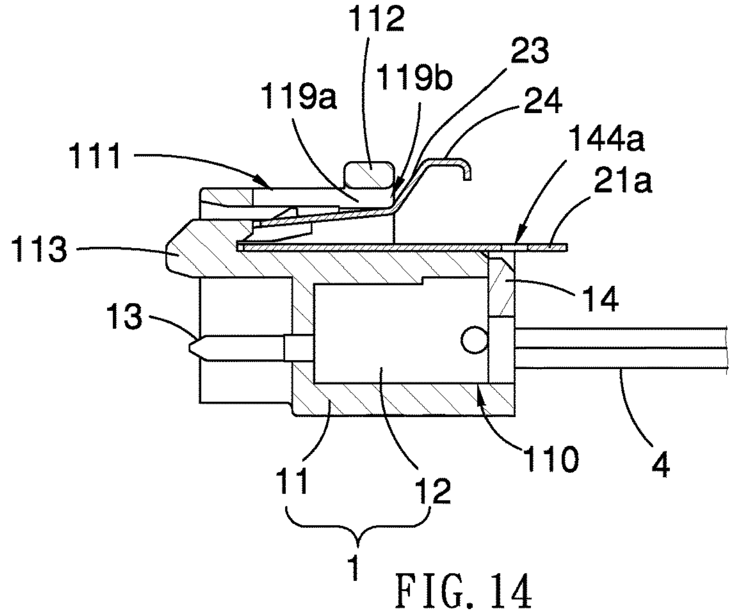
FIG. 14 is a partial cross-sectional view of the insulating body and the elastic latch of the plug connector of the present invention.
Figure 15:
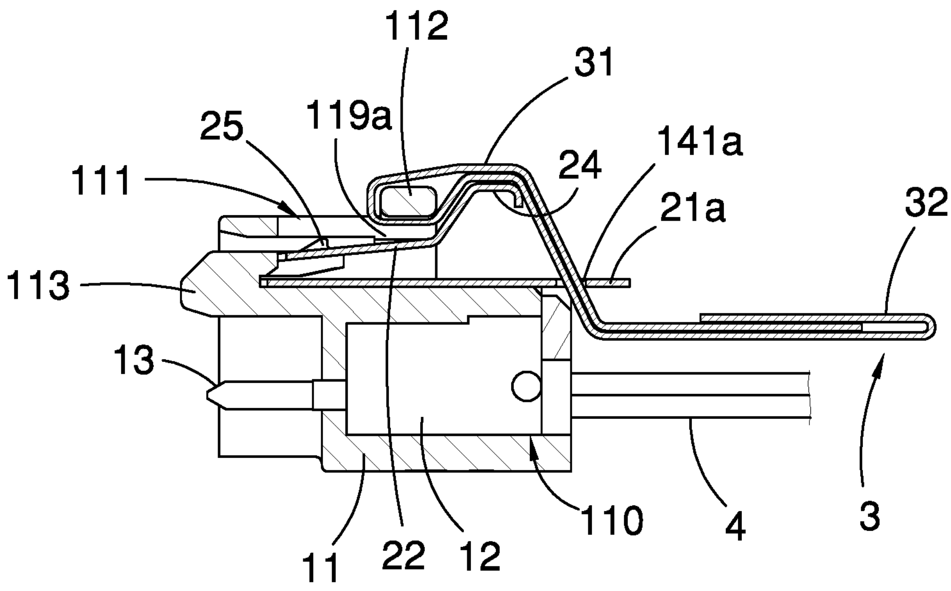
FIG. 15 is a partial cross-sectional view of the plug connector of the present invention.
Figure 16:
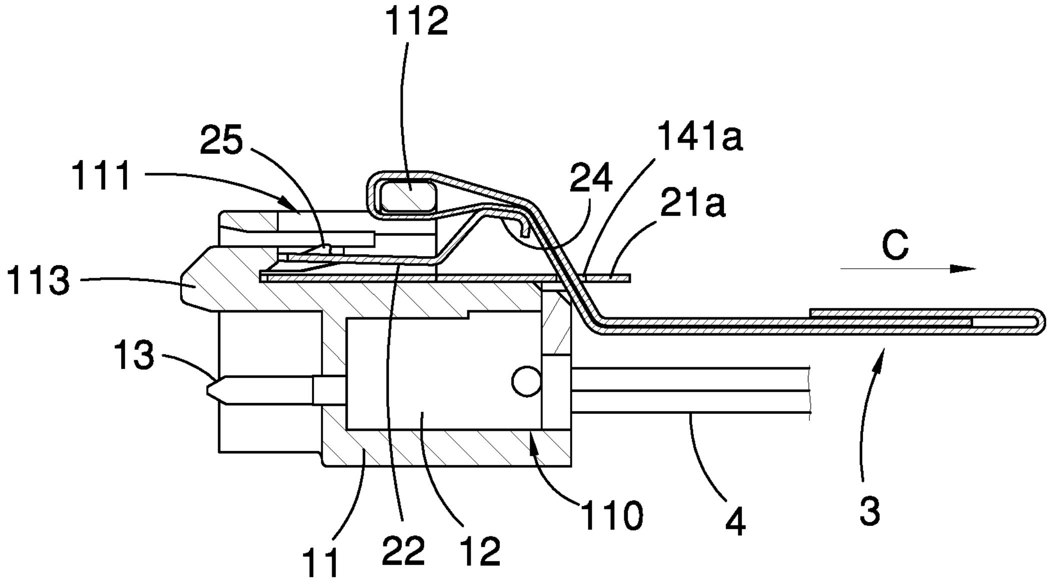
FIG. 16 is a partial cross-sectional view showing the pull tab being pulled towards the first direction.
Figure 17:
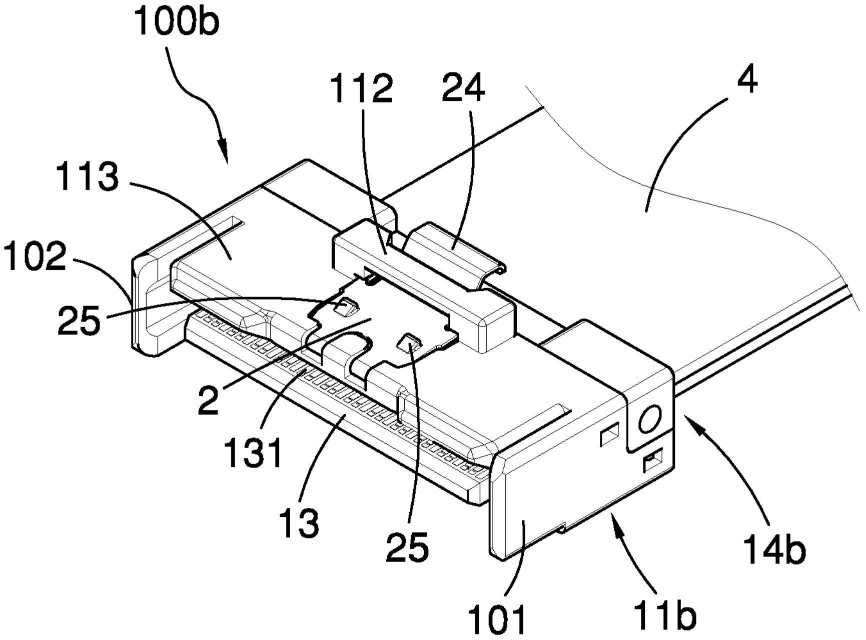
FIG. 17 is a perspective view of a plug connector of the present invention.
Figure 18:
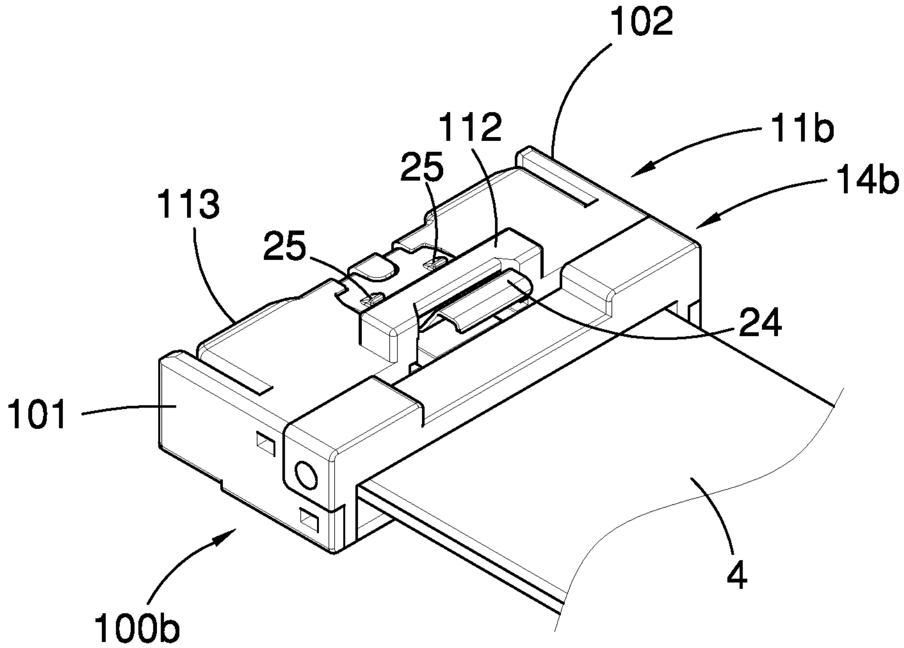
FIG. 18 is a perspective view of the plug connector of the present invention from a different angle.
Figure 19:
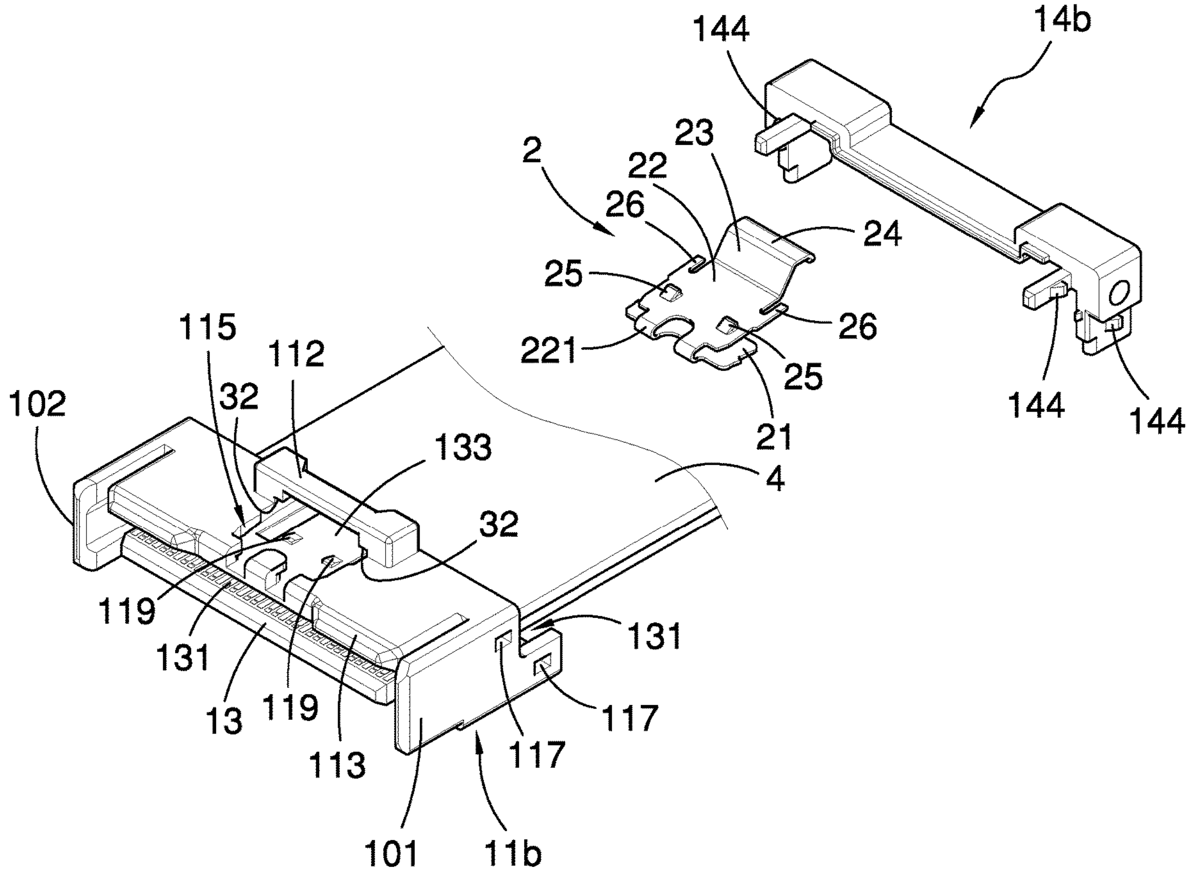
FIG. 19 is an exploded perspective view of the plug connector of the present invention.
Figure 20:
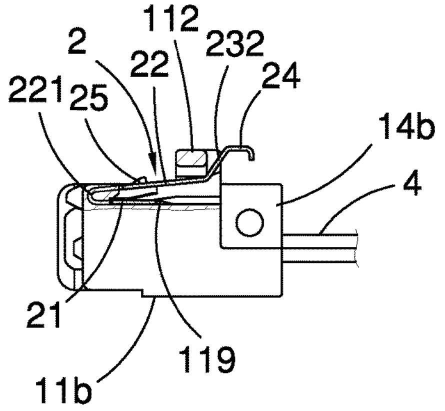
FIG. 20 is a partial cross-sectional view of the first housing of the plug connector of the present invention.
Figure 21:
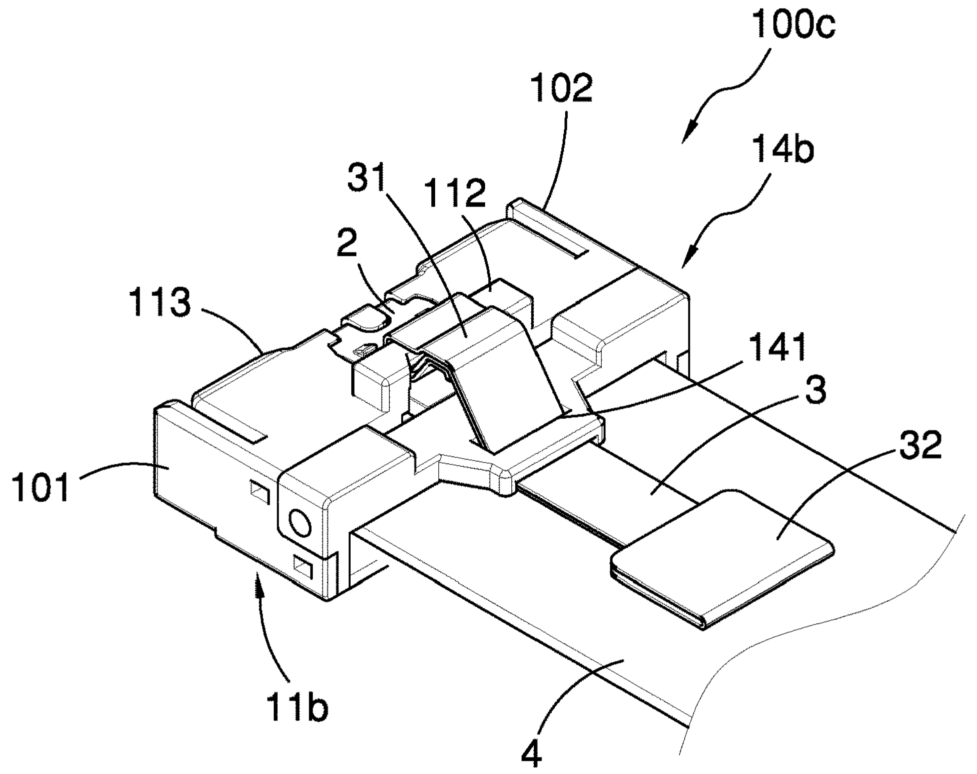
FIG. 21 is a perspective view of a plug connector of the present invention.
Figure 22:
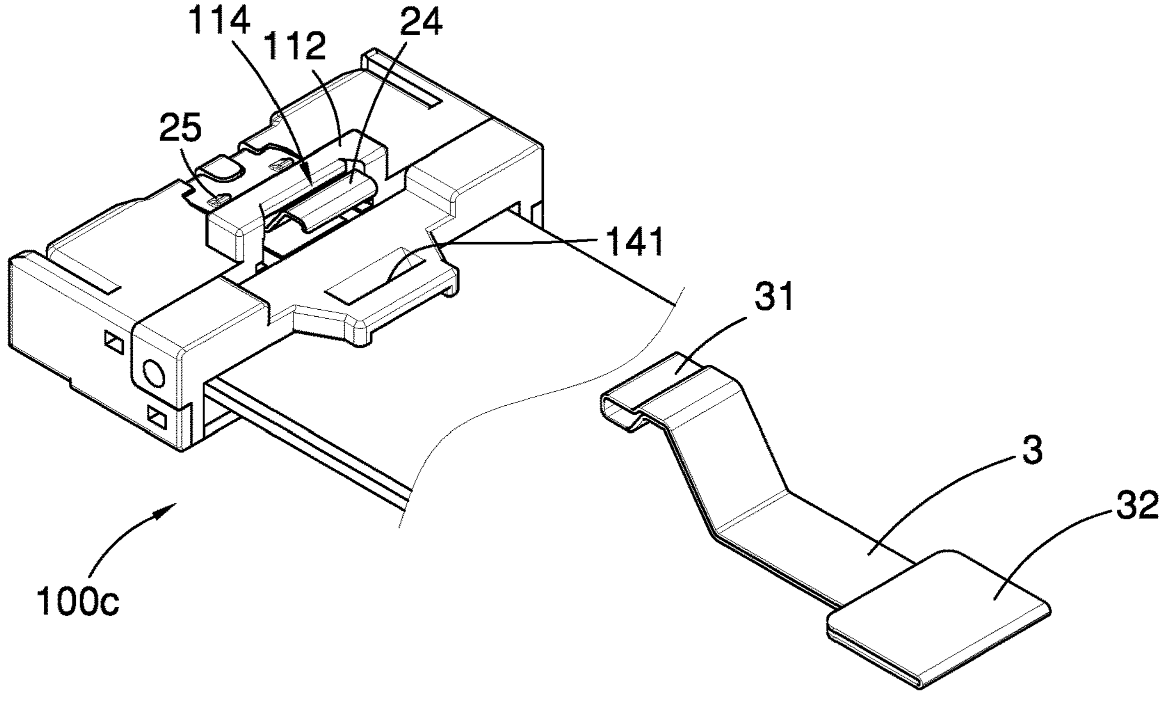
FIG. 22 is an exploded perspective view of the plug connector of the present invention.
Figure 23:
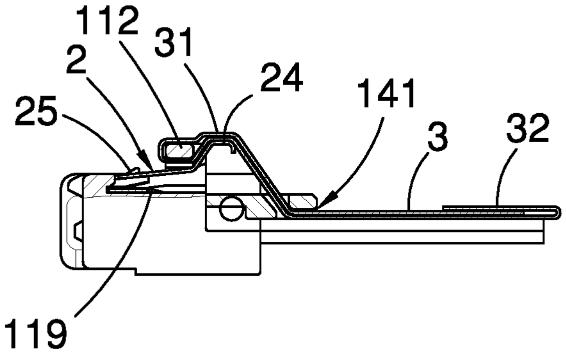
FIG. 23 is a partial cross-sectional view of the first housing of the plug connector of the present invention.
Figure 24:
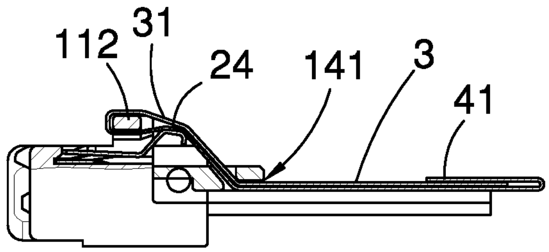
FIG. 24 is a partial cross-sectional view showing the pull tab being pulled towards the first direction.

As shown in FIG. 9, the passageway 141 is lower than the blocking bar 112, and the section between the passageway 141 and the blocking bar 112 where the pull tab 3 is located is above the pushing end 24 of the elastic latch 2. Hence, when the pull tab 3 is pulled along a first direction C (see FIG. 10), the pull tab 3 presses the elastic latch 2 downward to be unlocked by deformation.

The insulating body 1 is assembled by the first housing 11 and the second housing 12, but it can also be integrated.

Preferably, the elastic latch 2 can be made of an elastic metal sheet or an elastic plastic sheet. The elastic latch 2 is able to bounce from the position shown in FIG. 10 back to the position shown in FIG. 9 by its own elasticity.

FIGS. 11-16 show another type of plug connector 100*a*. The plug connector 100*a* is similar to the plug connector 100 shown in FIGS. 1-10, with the main difference being that the passageway 141*a* of the plug connector 100*a* is located on the fixed portion 21 of the elastic latch 2*a*, and not on the cover 14. The fixed portion 21 is extended to be behind the pushing portion 20 and preferably beyond the rear end of the insulating body 1. The passageway 141*a* is behind the pushing portion 20 and preferably beyond the rear end of the insulating body 1. The pull tab 3 is connected with the blocking bar 12 and passes through the passageway 141 of the cover 14.

FIGS. 17-20 show a type of plug connector 100*b*. The plug connector 100*b* is similar to the plug connector 100 shown in FIGS. 1-10, with the main difference being that the first housing 1*b* of the plug connector 100*b* only has the two opposing side plates 101 and 102, but not the top plate 103. Consequently, the blocking bar 112 of the plug connector 100*b* is connected to the mating portion 113, and not to the aforementioned top plate 103. Gaps are formed between the mating portion 113 and the side plates 101 and 102. Moreover, the shape of the cover **14*b* of the plug connector 100*b* is different from the cover 14 mentioned above, and the cable 4 is passed through an opening formed between the cover 14*b* and the first housing 11 when the cover 14*b* is assembled with the first housing 11. In other embodiment, the cable 4 may be sandwiched between the cover 14*b* and the first housing 11. The cover 14*b* has a plurality of first projections 144 on respective arms extended from the cover 14*b* and locked with corresponding recesses or openings of the first housing 11 when the arms are inserted into the first housing 11**.

FIGS. 21-24 show a type of plug connector **100*c*. The plug connector 100 is similar to the plug connector 100*b* shown in FIGS. 17-20, with the main difference being that the plug connector 100*c* has a pull tab 3 and a passageway 141. The blocking bar 112 has a recess 114 on the rear side for positioning a connection of the blocking bar 112 and the pull tab 3. The structure and the function of the pull tab 3 and the passageway 141** can be seen in the description above, and will not be described individually for the sake of brevity.

What is claimed is:

1. A plug connector comprising:

an insulating body including a mating portion and a receiving slot disposed on a top surface of the mating portion;

an elastic latch including a fixed portion and a pushing portion connected to the fixed portion, the fixed portion being fixed in the receiving slot of the mating portion, the pushing portion being located above the fixed portion, wherein the pushing portion includes a pushing end hung in the air and at least one hook provided between the fixed portion and the pushing end;

a blocking bar connected to the insulating body and spanning the pushing portion of the elastic latch, the blocking bar being provided between the pushing end of the elastic latch and the at least one hook and a pull tab with one end connected to the blocking bar, the pull tab being provided above the pushing end of the elastic latch, wherein the insulating body has a passageway that is lower than the pushing end of the elastic latch, the pull tab passing through the passageway.

2. The plug connector of claim 1, wherein the pushing end of the elastic latch is higher than the blocking bar.

3. The plug connector of claim 1, wherein the blocking bar has a recess for positioning a connection of the pull tab and the blocking bar.

4. The plug connector of claim 1, wherein the pushing portion of the elastic latch includes at least one bending portion, a first tilting portion and a second tilting portion, the bending portion being connected between the fixed portion and the first tilting portion, the second tilting portion extending upward and backward from the first tilting portion, the pushing portion extending upward and backward from the second tilting portion, wherein the at least one hook is disposed on a top surface of the first tilting portion while the blocking bar is disposed adjacent to a joint of the first tilting portion and the second tilting portion.

5. The plug connector of claim 4, wherein the first tilting portion has at least one limiting portion presses against a support of the blocking bar to form a gap between the first tilting portion and the blocking bar.

6. The plug connector of claim 1, wherein the insulating body includes a first housing, a second housing and a cover, the first housing including two opposite side plates, a top plate being connected with the two side plates and a first cavity formed by the top plate and the two side plates; wherein the top plate further includes a window in communication with the first cavity, the mating portion being provided in the first cavity and connected to the first housing, the blocking bar being connected to the top plate of the first housing and spanning the window; wherein the second housing and the cover are inserted into a second cavity of the first housing.

7. The plug connector of claim 6 further comprising a pull tab, wherein the cover has a passageway that is lower than the pushing portion, one end of the pull tab being connected to the blocking bar, and the pull tab passing through the passageway.

8. The plug connector of claim 7, wherein the passageway has two openings on two adjacent sides of the cover.

9. The plug connector of claim 7, wherein the cover has a protrusion extended to be beyond a rear side of the first housing, and the passageway is in the protrusion.

10. The plug connector of claim 1 further comprising a pull tab, wherein the insulating body includes a first housing, a second housing and a cover, the first housing including two opposite side plates, the mating portion being provided between the two side plates, the blocking bar being connected to the mating portion; wherein the second housing and the cover are inserted into the first housing, the cover having a passageway that is lower than the pushing portion, one end of the pull tab being connected to the blocking bar, the pull tab passing through the passageway.

11. The plug connector of claim 1 further comprising at least one bump on the receiving slot blocking a rear end of the fixed portion.

12. The plug connector of claim 1 further comprising a pull tab, wherein the fixed portion of the elastic latch has a passageway that is lower than the pushing portion, one end of the pull tab being connected to the blocking bar, the pull tab passing through the passageway.

13. The plug connector of claim 12, where the elastic latch further comprises at least one bending portion, the bending portion being connected between one end of the fixed portion and one end of the pushing portion so that the other ends of the fixed portion and the pushing portion extending in substantially the same direction, and the other end of the fixed portion is behind the other end of the pushing portion.

14. The plug connector of claim 1, wherein the insulating body includes a first housing, the first housing having two opposite side plates, a plurality of gaps being formed between the mating portion and the side plates.

15. The plug connector of claim 14, wherein the blocking bar is connected to the mating portion.

16. The plug connector of claim 14, wherein the pushing end of the elastic latch is higher than the blocking bar.

17. The plug connector of claim 16 further comprising a pull tab with one end connected to the blocking bar, the pull tab being provided above the pushing end of the elastic latch, wherein the insulating body has a passageway that is lower than the pushing end of the elastic latch, the pull tab passing through the passageway.

18. The plug connector of claim 14 further comprising a pull tab, wherein the fixed portion of the elastic latch has a passageway that is lower than the pushing portion, one end of the pull tab being connected to the blocking bar, the pull tab passing through the passageway.

19. The plug connector of claim 18, where the elastic latch further comprises at least one bending portion, the bending portion is connected between one end of the fixed portion and one end of the pushing portion to make the other ends of the fixed portion and the pushing portion extending in substantially the same direction, and the other end of the fixed portion is behind the other end of the pushing portion.

* * * * *